United States Patent

[11] 3,588,468

| [72] | Inventor | Georg Wendt |
| | | Paris, France |
| [21] | Appl. No. | 782,393 |
| [22] | Filed | Dec. 9, 1968 |
| [45] | Patented | June 28, 1971 |
| [73] | Assignee | CSF-Compagnie Generale De Telegraphie Sans Fils |
| [32] | Priority | Dec. 20, 1967 |
| [33] | | France |
| [31] | | 132,992 |

[54] ARRANGEMENT FOR MAKING LARGE-AREA HOMOGENEOUS PHOTOCATHODES IN VACUUM TUBES
5 Claims, 3 Drawing Figs.

[52] U.S. Cl. ................................................. 219/271, 118/49.1
[51] Int. Cl. ................................................. F22b 1/28
[50] Field of Search ........................................ 219/271-275, 420, 426, 427; 316/3, 4, 5; 118/48.0—49.5

[56] References Cited
UNITED STATES PATENTS

| 2,940,873 | 6/1960 | Toohig | 219/271UX |
| 3,117,210 | 1/1964 | Herb | 219/273 |
| 3,129,315 | 4/1964 | Radke et al. | 219/271 |
| 3,153,137 | 10/1964 | Drumheller | 219/271 |
| 3,344,768 | 10/1967 | Jennings | 118/48 |

FOREIGN PATENTS

| 1,389,581 | 1/1965 | France | 118/49 |

Primary Examiner—J. V. Truhe
Assistant Examiner—C. L. Albritton
Attorney—Cushman, Darby and Cushman ABSTRACT: An arrangement for forming by vaporization photocathodes, in vacuum tubes, comprising an entirely symmetrical electrical circuit for heating beads of photocathode forming substance so that all these beads receive the same amount of heat and are uniformly vaporized.

INVENTOR
GEORG WENDT

ARRANGEMENT FOR MAKING LARGE-AREA HOMOGENEOUS PHOTOCATHODES IN VACUUM TUBES

The present invention relates to the manufacture of photocathodes.

In certain photocathode tubes, it is well known to manufacture the photocathode in the course of one of the stages of manufacture of the tube itself, by vaporizing antimony beads slipped over a conductor located inside the tube and raised to the desired temperature by Joule effect.

However, it happens frequently that the photocathodes obtained in this way show non uniform sensitivity all over their surface due to the fact that the antimony beads are not all brought to the same temperature at the same time by the heating conductor, so that antimony is deposited unequally on the opposite located photocathode surface.

Differences arising in the temperatures of the various antimony beads are due either to the fact that the beads are not properly distributed upon heating conductor, or to the fact that there are dissymetries in the heating of the conductor due to the contact resistances at certain points, such as soldered joints, junctions and connections.

It is an object of the present invention to obviate these drawbacks, thus providing photocathodes of relatively large diameter having an improved homogeneity as compared to those now produced.

According to the invention there is provided an arrangement for forming a photocathode within a vacuum tube comprising: at least one support; means for positioning said support in a vacuum tube opposite the location where the photocathode is to be formed; and on said support a heating conductor, identical bodies of photocathode forming substance regularly spaced along said conductor for receiving heat therefrom, said conductor having terminal connections to a source of electrical energy the shortest distances between said bodies and said connections being equal.

For a better understanding of the invention and to show how the same may be carried into effect, reference will be made to the drawing accompanying the ensuing description and in which.

In these FIGS. similar references designate similar elements.

Figure 1:
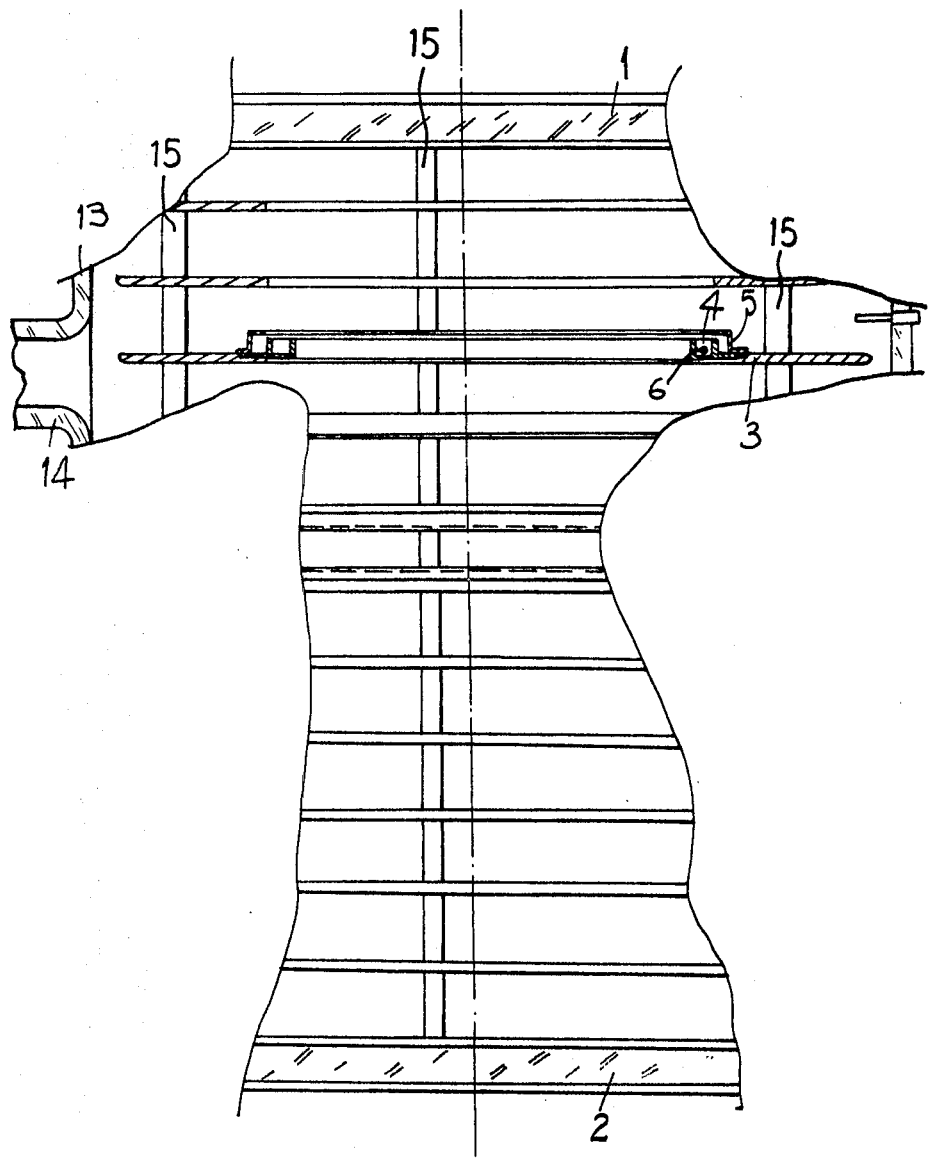
FIG. 1 is a partial sectional view of a broken away part of a tube in accordance with the invention.
Figure 2:
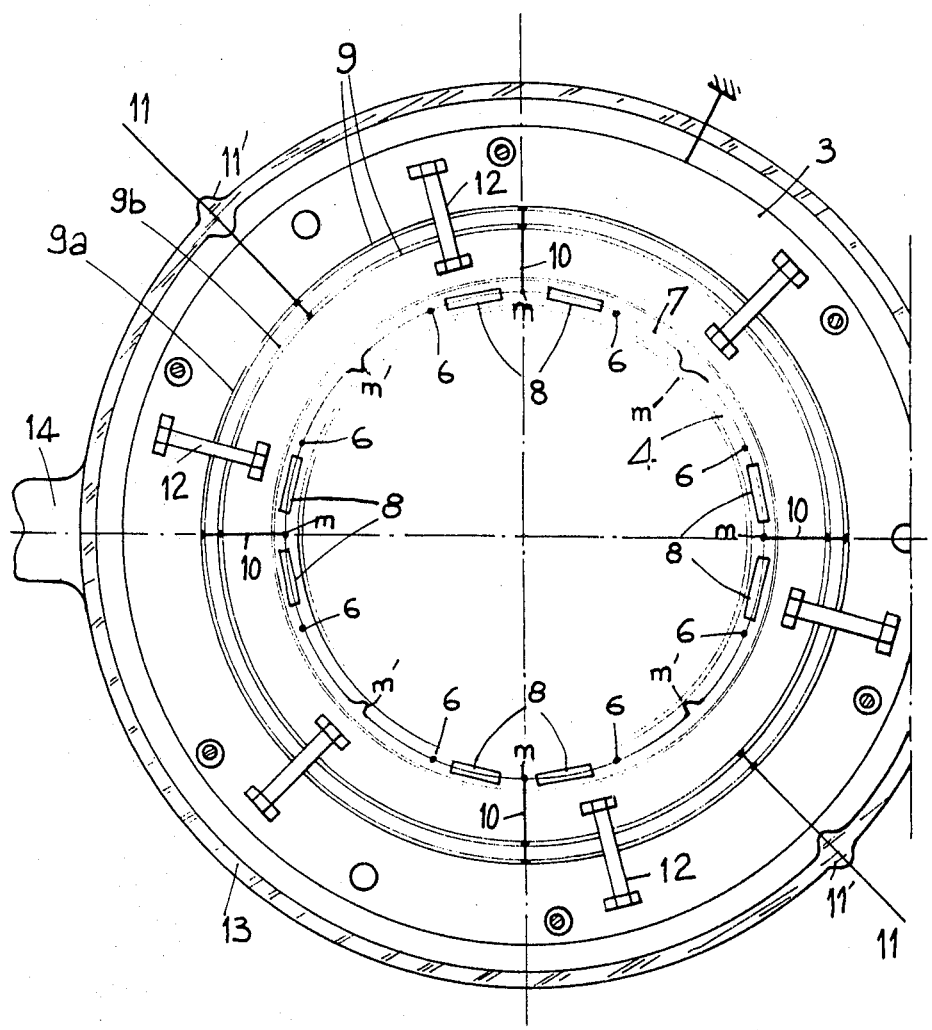
FIG. 2 is a partial plan view of the photocathode-producing arrangement incorporated into the tube of FIG. 1.

The embodiment of FIGS. 1 and 2 relates to a cylindrical image tube, which it is desired to provide with a photocathode 1. Some elements forming part of the tube appearing in the view of FIG. 1 do not have any bearing upon the present invention, such as, for example, the horizontal focusing electrodes and the screen 2. The quartz rods 15 which support the focusing electrodes also support, opposite the photocathode, as shown in FIG. 1, discs 3 of nickel, molybdenum or tantalum, for example; these discs have a circular groove 4 formed therein and a mask 5 fixed to the disc 3. While only one disc 3 has been shown, in fact a plurality of such discs are used, each disc serving for depositing by vaporization of given substance.

As shown in FIG. 2, eight identical bodies 6 of cathode forming substance are associated with a conductor 7 forming a circular turn extending through insulating tubes 8 resting upon the bottom of the groove 4. The bodies 6 and the conductor 7 are shown in FIG. 2 in purely symbolical manner. In fact, they are, for example, beads threaded on the conductor 7 in the case of antimony. The bodies 6 may also be formed by a material filling conductor 7, which in this case is tubular. Another circular conductor 9 concentric with the turn 7 is disposed externally of the groove 4 on the disc 3. The conductor 9 serves as a connection between the conductor 7 and a supply source (not shown) and has for this purpose a large conductive cross section. In the embodiment described, there are two concentric conductors 9a and 9b but a single conductor may as well be used, provided that it has a sufficient cross section for not to be heated to any appreciable degree by the passage of current through it. Four identical connections 10, located along four equispaced radii, connect alternate intermediate points $m$ between adjacent antimony beads, to the conductors 9a and 9b. Two diametrically opposite connections 11 connect the conductors 9a and 9b to one of the pole of the supply source (not shown) through the passages 11' in the envelope 13 of the tube. The latter has an exhaust pipe 14.

As FIG. 2 shows, the points of connection of the conductors 9a and 9b to the source, are distant from the points at which the antimony beads are slipped on the conductor 7. The latter is connected, for example, by electric welding, at the four other intermediate points $m'$ between the beads 6, to the disc 3, which is connected through ground to the second pole of the supply source. Refractory brackets 12 resting on the disc 3 are used for fixing the wires 9a and 9b.

The conductor 7 is for example a fine platinum-plated molybdenum wire.

When the current source is connected, at the time when it is desired to produce the photocathode, the current flowing through the small-section wire 7 heats same and causes the antimony beads to vaporize.

With the symmetrical disposition which is characteristic of the present invention, all the beads are raised to the same temperature at the same time, and the antimony layer obtained upon the internal face of the cathode support 1 (FIG. 1) is uniform, even where large areas are concerned, in the order of 80 mm. diameter, for example, or larger.

The function of the mask 5 (FIG. 1) which has the form of a rim (not shown in FIG. 2), is used for limiting the vaporization angle.

As already mentioned, the manufacture of photocathodes according to the invention involves, in addition to vaporization of antimony, a further vaporization of alkali substances, such as K or Na.

All the substances used have to be deposited in a uniform manner. The procedure and the arrangements used are the same as that described above.

Figure 3:
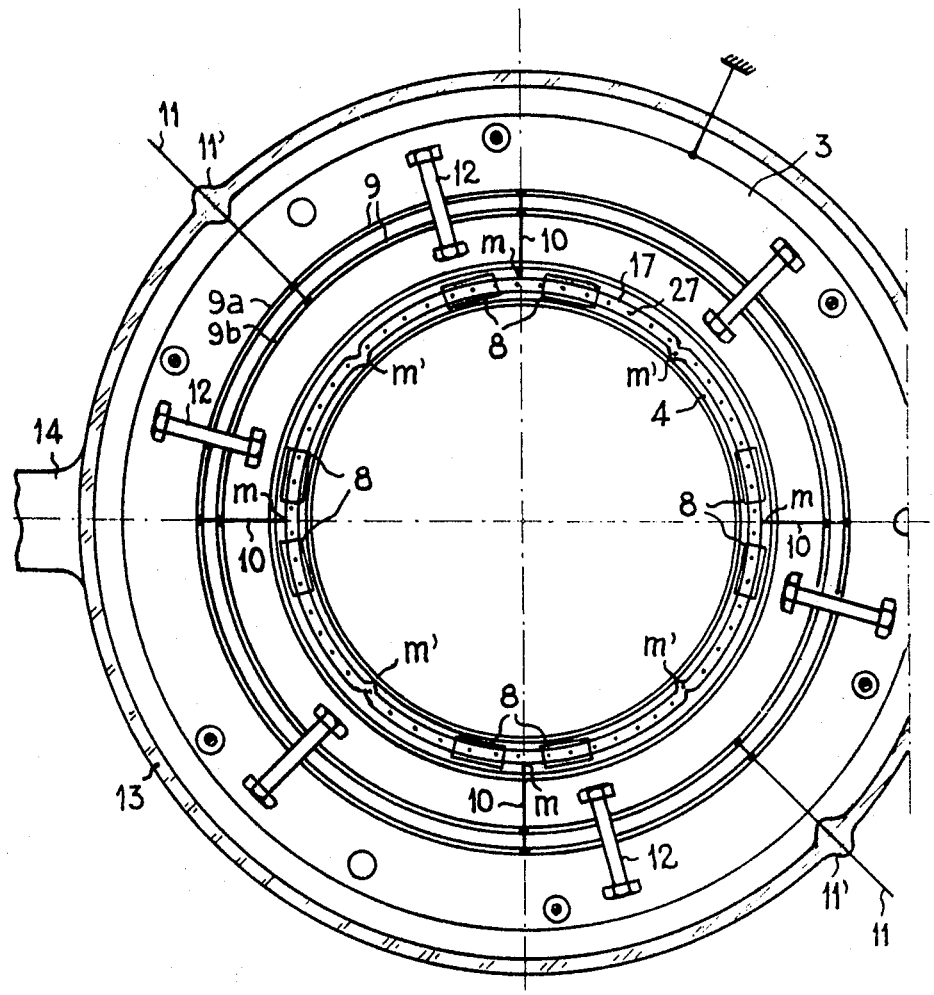
FIG. 3 is a partial plan view of another photocathode-producing arrangement according to the invention.

In the case of alkali substances, the heating conductor is preferably made of perforated tubes filled with these substances in a powdered state. FIG. 3 shows such a perforated tube 17, which has been enlarged, whose perforations are indicated in 27.

The vaporization angle limited by the mask 5 of FIG. 1 is adjusted to optimum value in each case.

Of course, the invention is not limited to the embodiment described and shown which was given solely by way of example.

I claim:

1. An arrangement for forming a photocathode within a vacuum tube comprising at least one support; means for positioning said support in a vacuum tube opposite the location where the photocathode is to be formed; and on said support a heating conductor, identical bodies of photocathode forming substance positioned regularly spaced along said conductor for receiving heat therefrom, said conductor having terminal connections to a source of electrical energy the shortest distances between said bodies and said connections being equal.

2. An arrangement as claimed in claim 1, wherein said heating conductor is a single circular ring regularly connected to another circular ring concentric with said mentioned circular ring.

3. An arrangement for forming a vacuum tube provided with a photocathode in a given location inside said tube, said arrangement comprising: a vacuum envelope; supporting means inside said envelope in fixed space relationship relatively to said envelope; a heating conductor, forming a close loop, supported by said supporting means; identical sources of photocathode forming substance located for being evaporated towards said location upon said conductor being energized said sources being spaced along said conductor; a set of first connection points regularly spaced along said conductor, and a set of second connection points regularly spaced along said conductor, the number of said second connection points being equal to the number of said first connection points, and means for connecting said set of first connection points and said set of second connection points respectively to the two terminals of an electrical energy supply.

4. An arrangement as in claim 3, wherein:

said conductor is a wire, and said sources are beads of said photocathode forming substance threaded on said wire.

5. An arrangement as in claim 3, wherein:

said conductor is a tube provided with perforations and filled with said photocathode forming substance, each of said perforations delimiting one of said sources.